(Model.)

A. MORISSEAU.
COUNTERSINK AND DRILL.

No. 396,663. Patented Jan. 22, 1889.

Witnesses:
Severance
L. H. Whiting.

Inventor,
Auguste Morisseau.
By L. Deane
his Attorney.

N. PETERS, Photo-Lithographer, Washington, D. C.

UNITED STATES PATENT OFFICE.

AUGUSTE MORISSEAU, OF NANTES, FRANCE.

COUNTERSINK AND DRILL.

SPECIFICATION forming part of Letters Patent No. 396,663, dated January 22, 1889.

Application filed April 7, 1888. Serial No. 269,968. (Model.)

*To all whom it may concern:*

Be it known that I, AUGUSTE MORISSEAU, a citizen of the Republic of France, residing at Nantes, in the said Republic, have invented certain new and useful Improvements in Countersinks and Fine Boring-Tools, of which the following is a specification, reference being had therein to the accompanying drawings.

The aim of the present invention is to produce a single tool by which to drill holes, fine bore and finish them, and also to countersink the same to any desired depth, and all without displacing the piece of work from its position in relation to the tool, as will now be more fully set out and explained, reference being had to the accompanying drawings.

Figure 1:
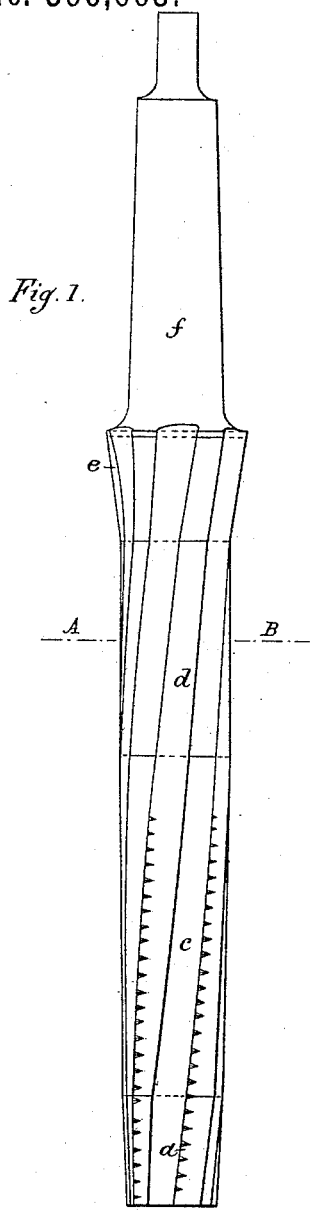
Figure 3:
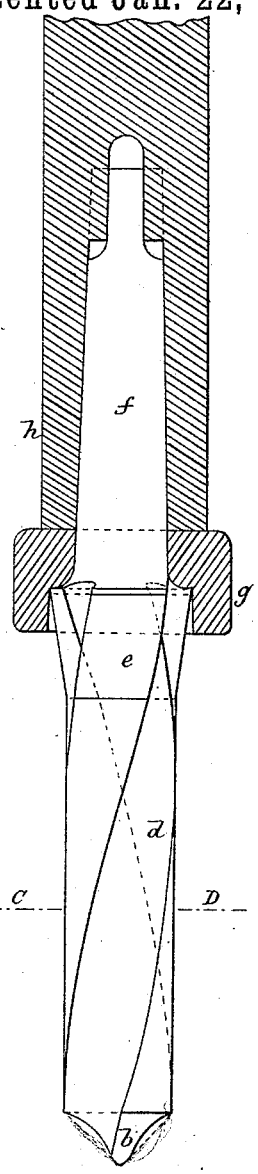
Figure 2:
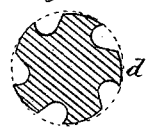
Figure 4:
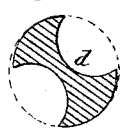

Figure 1 is a side elevation of the tool made as reaming and countersinking device. Fig. 2 is a cross-section of Fig. 1 on line A B. Fig. 3 is a side elevation of the tool as boring, reaming, and countersinking device, also showing the washer at its upper end, whereby the depth of the countersink is regulated, also the chuck.

In Fig. 1 of the drawings, $c$ and $d$ respectively indicate the twist formed by spiral raised and depressed parts of the drill, and $e$, at its upper end, the conical and upwardly-enlarging part, having the same spiral features, and which constitutes the reaming portion of the drill or tool. In Fig. 3, which is a drill proper, the twist is made a little different and there are fewer of the projecting parts $d$ of the tool, and in this $b$ is the helicoidal boring-point. The conical and upwardly-enlarging upper end, $e$, is in general structure and purpose like the corresponding part of the tool, as represented in Fig. 1. The head or shank $f$ of the tool is square or conical.

When the operation of reaming is performed, the washer $g$ is placed on its upper end, between it and the socket $h$, so as to overhang the upwardly-enlarging part $e$ of the tool. The depth of the countersink can be regulated by using a washer of any desired thickness. The bore in the head of the washer is of suitable size to fit easily the shank of the tool, while the bore of the body is enlarged, so that it will be adapted to the upper end of the conical part $e$ of the tool, so as to overhang it, as has been said above.

This tool is very simple in structure and very admirable in use, in that it does its work so well and at such an economy of the laborer's time as in so large a degree the time and labor required to arrange and regulate the work in relation to the tool are obviated.

Having now described my invention, what I claim is—

1. In combination with a drill or reamer having a conical upper end and the socket, a washer of any desired thickness fitting upon the upper end of said drill so as to overhang it, whereby the reamer may be allowed to descend to any given depth into the hole that is to be reamed, substantially as described.

2. The within-described tool, having any desired twist, $c$ $d$, and an enlarged conical upper end, $e$, combined with the washer $g$ and the socket $h$, substantially in the manner and for the purposes set forth.

In testimony whereof I affix my signature in presence of two witnesses.

AUGUSTE MORISSEAU.

Witnesses:
 KENNET DEBON,
 RACHERON.